United States Patent
Post (10) Patent No.: US 8,985,030 B2
(45) Date of Patent: Mar. 24, 2015

(54) INDUCTRACK III CONFIGURATION—A MAGLEV SYSTEM FOR HIGH LOADS

(75) Inventor: Richard F. Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1611 days.

(21) Appl. No.: 12/233,205

(22) Filed: Sep. 18, 2008

(65) Prior Publication Data
US 2010/0064929 A1    Mar. 18, 2010

(51) Int. Cl.
*B60L 13/10*    (2006.01)
*B60L 13/04*    (2006.01)

(52) U.S. Cl.
CPC .............. *B60L 13/04* (2013.01); *B60L 2200/26* (2013.01)
USPC .......................................... 104/283; 104/281

(58) Field of Classification Search
USPC ................................. 104/281–286
See application file for complete search history.

(56) References Cited

U.S. PATENT DOCUMENTS

| | | | |
|---|---|---|---|
| 3,791,309 A | 2/1974 | Baermann | |
| 3,885,504 A | 5/1975 | Baermann | |
| 5,651,318 A | 7/1997 | O'Donohue | |
| 5,666,883 A * | 9/1997 | Kuznetsov | 104/281 |
| 5,722,326 A * | 3/1998 | Post | 104/281 |
| 6,629,503 B2 * | 10/2003 | Post | 104/281 |
| 6,633,217 B2 * | 10/2003 | Post | 335/306 |
| 6,664,880 B2 * | 12/2003 | Post | 335/306 |
| 6,758,146 B2 * | 7/2004 | Post | 104/281 |
| 7,478,598 B2 * | 1/2009 | Post | 104/281 |
| 7,757,609 B2 * | 7/2010 | Fiske et al. | 104/130.02 |
| 2003/0005851 A1 * | 1/2003 | Post | 104/281 |
| 2003/0112105 A1 * | 6/2003 | Post | 335/285 |
| 2005/0204948 A1 * | 9/2005 | Post | 104/281 |
| 2007/0089636 A1 | 4/2007 | Guardo, Jr. | |
| 2007/0131134 A1 * | 6/2007 | Post | 104/284 |
| 2008/0074223 A1 * | 3/2008 | Pribonic | 335/306 |
| 2010/0064929 A1 * | 3/2010 | Post | 104/283 |

* cited by examiner

*Primary Examiner* — Jason C Smith
(74) *Attorney, Agent, or Firm* — John P. Wooldridge (57) ABSTRACT

Inductrack III configurations are suited for use in transporting heavy freight loads. Inductrack III addresses a problem associated with the cantilevered track of the Inductrack II configuration. The use of a cantilevered track could present mechanical design problems in attempting to achieve a strong enough track system such that it would be capable of supporting very heavy loads. In Inductrack III, the levitating portion of the track can be supported uniformly from below, as the levitating Halbach array used on the moving vehicle is a single-sided one, thus does not require the cantilevered track as employed in Inductrack II.

20 Claims, 7 Drawing Sheets

INDUCTRACK III CONFIGURATION—A MAGLEV SYSTEM FOR HIGH LOADS

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to magnetic levitation, and more specifically, it relates to inductrack systems.

2. Description of Related Art

Inductrack is a completely passive, fail-safe magnetic levitation system, using only unpowered loops of wire in the track and permanent magnets (arranged into Halbach arrays) on the vehicle to achieve magnetic levitation. The track can be in one of two configurations, a "ladder track" and a "laminated track". The ladder track is made of unpowered Litz wire cables, and the laminated track is made out of stacked copper or aluminum sheets.

There are two prior art designs: the Inductrack I, which is optimized for high speed operation, and the Inductrack II, which is more efficient at lower speeds.

Inductrack was invented by a team of scientists at Lawrence Livermore National Laboratory, headed by physicist Richard F. Post, for use in maglev trains. The only power required is to push the train forward against air and electromagnetic drag, with increasing levitation force generated as the velocity of the train increases over the loops of wire.

Its name comes from the word inductance or inductor; an electrical device made from loops of wire. As the magnet array (with alternating magnetic field orientations) passes over the loops of wire, it induces a current in them. The current creates its own magnetic field which repels the permanent magnets. The Inductrack II variation uses two Halbach arrays, one above and one below the track to double the levitating magnetic field without substantially increasing the weight or footprint area of the Halbach arrays, while having lower drag forces at low speeds.

SUMMARY OF THE INVENTION

It is an object of the present invention to provide a magnetic levitation system suitable for transporting heavy loads.

This and other objects will be apparent based on the disclosure herein.

A new Inductrack configuration, herein referred to as "Inductrack III," is described and is especially suited for use in transporting heavy freight loads. Inductrack III addresses a problem associated with the cantilevered track of the Inductrack II configuration. The use of a cantilevered track could present mechanical design problems in attempting to achieve a strong enough track system such that it would be capable of supporting very heavy loads. In Inductrack III, the levitating portion of the track can be supported uniformly from below, as the levitating Halbach array used on the moving vehicle is a single-sided one, thus does not require the cantilevered track as employed in Inductrack II.

The new configuration also provides additional advantages over the Inductrack I configuration in that it makes it possible to increase the levitation efficiency (Newtons levitated per Watt of drag power) by factors of two or three for high-loads, and by even larger factors (four or five in typical cases) in low-load situations. Such a situation would occur in transporting loaded containers from a container ship to an intermodal distribution center, and then returning the unloaded containers to the seaport.

In addition to increasing the levitation efficiency for both high- and low-load situations, the Inductrack III configuration permits a major reduction in the gap increase at low load. A large increase in gap is endemic to the Inductrack I configuration when it experiences a large reduction in the load it is carrying, such as would be the case for the container-ship service function described in the previous paragraph.

A further advantage of the new configuration is that it allows the dual-use of the "generator" section of the Inductrack III Halbach arrays. That is, the necessary windings for a linear synchronous motor (LSM) drive system could be piggy-backed on either side of the track assembly, where they would couple tightly to the strong transverse field component of the-dual Halbach array that comprises the generator section.

Another embodiment of the present invention employs mechanically adjustable bias permanent magnets to levitate a controlled portion of the load, thereby still further reducing the drag power compared to a simple Inductrack I system. The concept could also be employed to further increase the levitation efficiency of an Inductrack II system, with the adjustability feature being employed to optimize the performance.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The invention is a new Inductrack maglev configuration that is especially adapted for use with a laminated track when heavy loads are to be carried. In such situations, the use of the dual-Halbach-array of the Inductrack II configuration, some embodiments of which are described in U.S. Pat. Nos. 6,633,217 and 6,664,880, both incorporated herein by reference, which requires a cantilevered track, presents mechanical-support problems associated with that track configuration. Cantilevering requires that the track be supported entirely by clamps applied to one of its edges. The track itself thus must be stiff enough to resist the bending moment that would be caused by its carrying a heavy load. Such mechanical stress problems would be alleviated by using the Inductrack I (single Halbach array) configuration, some embodiments of which are described in U.S. Pat. No. 5,722,326, incorporated herein by reference, where the load, being only exerted from above, allows the track to be supported uniformly from below, thus greatly alleviating the mechanical support problem. However, the use of the Inductrack I configuration alone carries with it substantially higher drag power losses than those of Inductrack II, owing to the fact that in the Inductrack I configuration there is no way to reduce the drive current relative to the levitating field in order to optimize the levitation efficiency (Newtons/Watt) in the ways that are possible with Inductrack II. In Inductrack II, one can vary the parameters of the lower Halbach array relative to the upper one in order to optimize the levitation efficiency. The Inductrack III configuration, to be described, permits the use of a single-sided Halbach-array, while at the same time providing a means of controlling the levitation current in such a way as to optimize the levitation efficiency. Another feature of this invention enhances the levitation efficiency when the load is reduced substantially below the normal (high) load that is to be carried. This feature will be particularly valuable in cases where a maglev system is used to shuttle heavily loaded containers from a container freight ship to an inter-modal station, after which the train then returns empty or loaded only with empty containers. In such a case the overall energy efficiency of the round-trip is substantially enhanced. Examples of laminated tracks are described in U.S. Pat. No. 6,758,146 incorporated herein by reference.

Figure 1A:
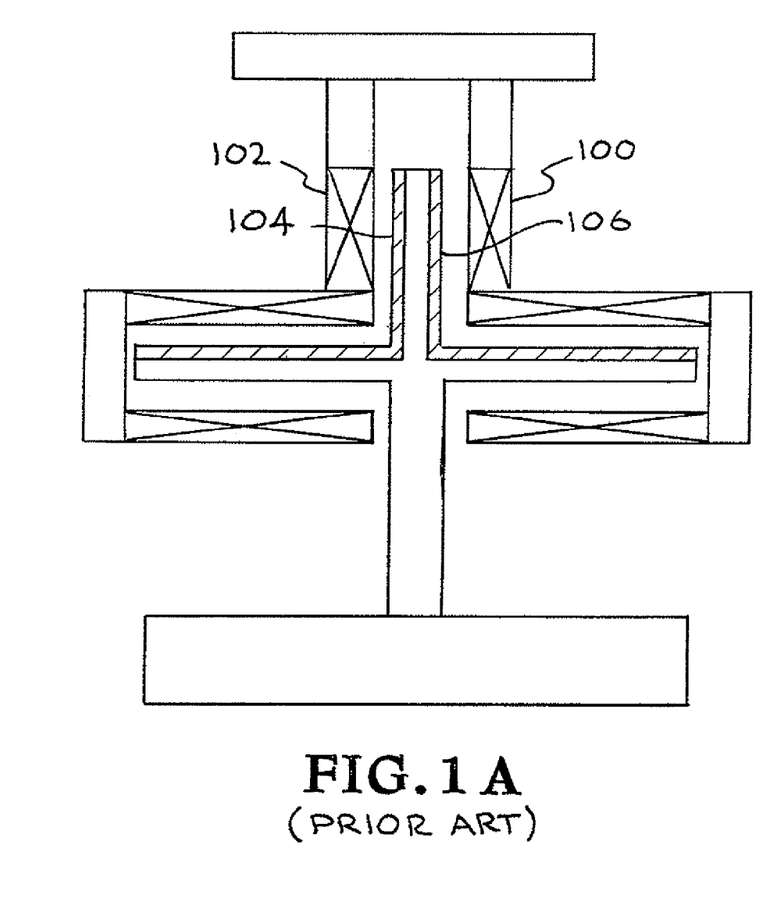
FIG. 1A shows a prior art Inductrack II dual-Halbach-array configuration.
Figure 1B:
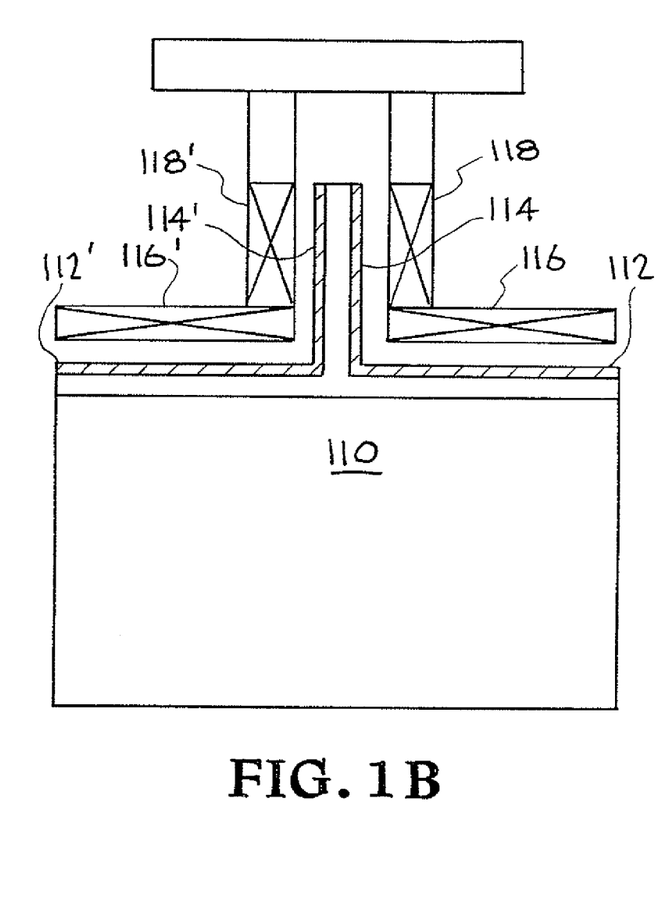
FIG. 1B shows an embodiment of the present invention in which the polarization of the vertically oriented dual Halbach array "generator" can be arranged either to reduce, or to increase, the current induced in the track relative to that which would be induced by the horizontally oriented Halbach arrays acting alone.

In FIG. 4 of U.S. Pat. No. 6,664,880, reproduced here as FIG. 1A, there is shown a modification of the normal Inductrack II, dual-Halbach-array configuration. In the modified version described in the patent, a vertically oriented dual Halbach array "generator" (100, 102) is provided as a means of controlling the current level induced in the laminated track sections (104, 106) shown in the drawing. An embodiment of the present invention closely resembles the configuration shown in FIG. 1A, except that the horizontal (levitating) dual-Halbach arrays are replaced by single-sided arrays, thereby allowing the laminated track to be supported from below, rather than being cantilevered, as in FIG. 1A. In the new configuration, an embodiment of which is shown in FIG. 1B, the polarization of the vertically oriented dual Halbach array "generator" can be arranged either to reduce, or to increase, the current induced in the track relative to that which would be induced by the horizontally oriented Halbach arrays acting alone. Reducing the current would increase the levitation efficiency; increasing it would allow a given area of array to carry a higher load than otherwise would be possible (at an increased drag power). The present invention is mainly concerned with the former case, i.e., increasing the levitation efficiency by reducing the induced current. Although substantial gains in levitation efficiency are possible through this invention, the levitation of a given load will require a larger area of levitating arrays than is the case with Inductrack I so that magnet costs, weights and area constraints will eventually impose an upper limit to the efficiency gains that are practical.

Figure 2:
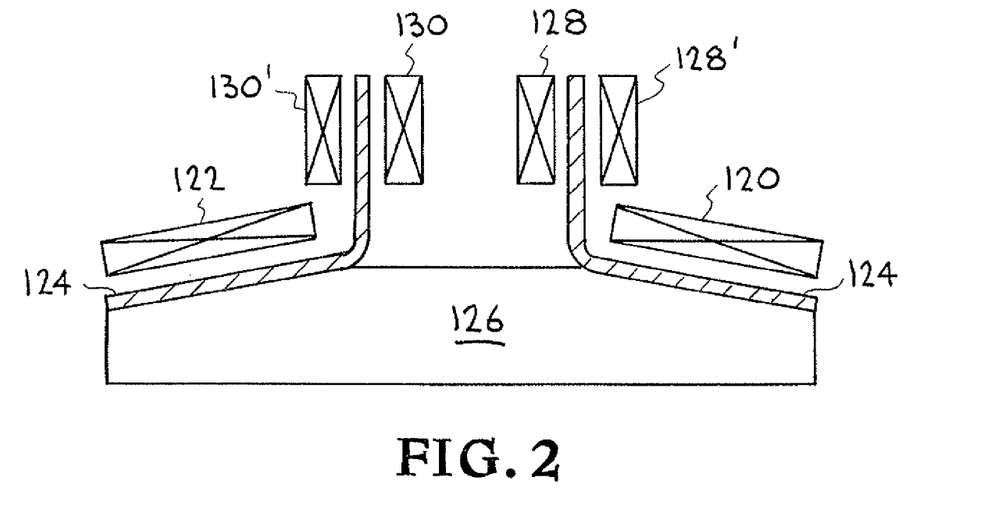
FIG. 2 shows an embodiment of the present invention that uses two sets of "single-sided" Inductrack III arrays.

As shown in FIG. 1B, the horizontal (levitating) portions 112 and 112' of the track are supported by a uniform support structure 110, which is presented as just one example of a type of support that could be used. While FIG. 1B shows a case where the levitating arrays 116 and 116' are horizontal, there are cases where the angle between the "generator" arrays 118 and 118' and the levitating arrays 116 and 116' would differ from 90° so as to provide "dihedral-angle" stabilization against lateral motions. In such cases, the angle between the vertical (generating) portions 114 and 114' of the track and the horizontal portions will be set at about the same dihedral-angle as that between the generator arrays and the levitating arrays. FIG. 2 shows an embodiment of the present invention that uses two sets of "single-sided" Inductrack III arrays 120 and 122; one is on the right side of the train car, and one is on the left side, to provide both levitation and lateral stabilization. This alternate configuration possesses improved constructional and operational advantages relative to the double-sided array shown in FIG. 1A. The angle between levitation arrays 120 and 122 provides stabilization against lateral motion. The track portions 124 and 124' that are beneath the levitation arrays are uniformly supported by support structure 126. Dual Halbach arrays (128, 128' and 130, 130') are attached to the train car (not shown) and each dual array surround the vertically extending portion of track (124, 124').

Figure 3:
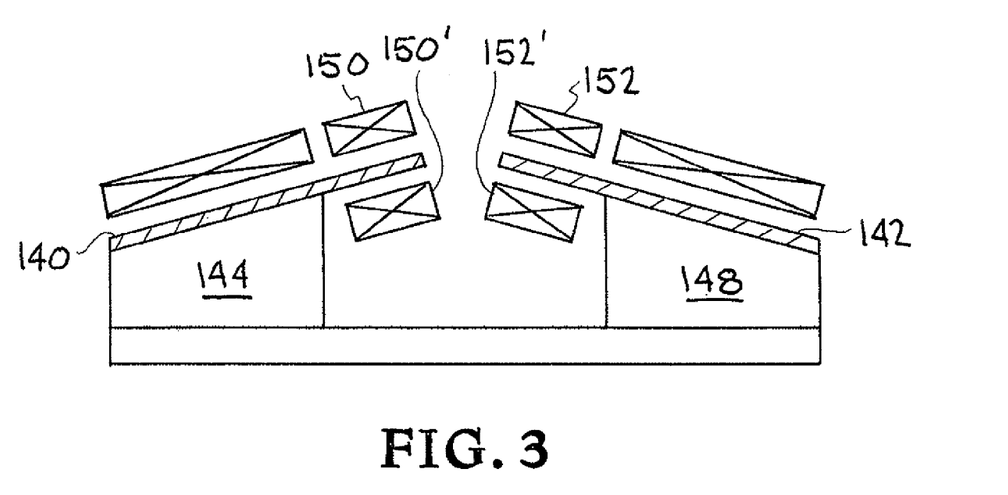
FIG. 3 shows a "linear" embodiment having no bend in the track portions which overhang their respective support structure on the inboard side.

A simplified version of the embodiment of FIG. 2 is shown in FIG. 3. In this "linear" embodiment there is no bend in each track portion 140 and 142, and the tracks overhang their respective support structure 144 and 148 on the inboard side of each track. The overhanging track portions are located between a double Halbach array 150, 150' and 152, 152', to accomplish the current control needed to improve the efficiency of the single-sided levitation Halbach array. Again, the dihedral angle of the two tracks provides centering forces when the train car is in motion.

In all of the three configurations shown in FIGS. 1B, 2, and 3, the possibility exists for combining the levitation function of the assembly with a propulsion function based on the Linear Synchronous Motor (LSM) concept Since the dual-Halbach-Array "generator" has a strong transverse field, it is ideally suited to couple to an appropriately designed set of LSM windings. If the gap between the two Halbach arrays of the dual array allows, the LSM windings can be collocated with the track itself by forming two zig-zag patterns of windings, on either side of the "generator" end of the track and spaced far enough from the track surfaces to limit the inductive coupling between the LSM windings and the track circuits. Since the currents in the winding legs on opposite sides of the track flow in the same direction, the magnetic fields from the two winding legs tend to cancel each other in the region between them, thus still further reducing the inductive coupling between the LSM windings and the track circuits. Another embodiment extends the dual Halbach array in length and locates the LSM windings so that they are coplanar with the track but lie at the far end of the array. To minimize eddy current losses in the return-circuit portion of the track, the dual Halbach array could be broken into two arrays, with a gap between them where the return-circuit portion of the track is located.

To provide quantitative examples of the improved levitation efficiency of the Inductrack III configuration, as compared to an Inductrack I system with the same levitating Halbach array, a computer code was written, based on modification and extension of previously developed codes. The results from this code clearly show the possibility of increasing the levitation efficiency (reducing the drive-power requirements) by factors of two to three. It was found, as was expected, that a greater relative reduction in drive-power occurred on the "return-trip," i.e., the unloaded portion of a container-hauling trip, when the train car returns, carrying empty containers, from delivering loaded containers to an inter-modal station. For heavily loaded containers this latter feature represents a substantial additional economic gain (from reduced power costs) as compared to the Inductrack I configuration if it were to be employed to perform the same function.

Figure 4A:
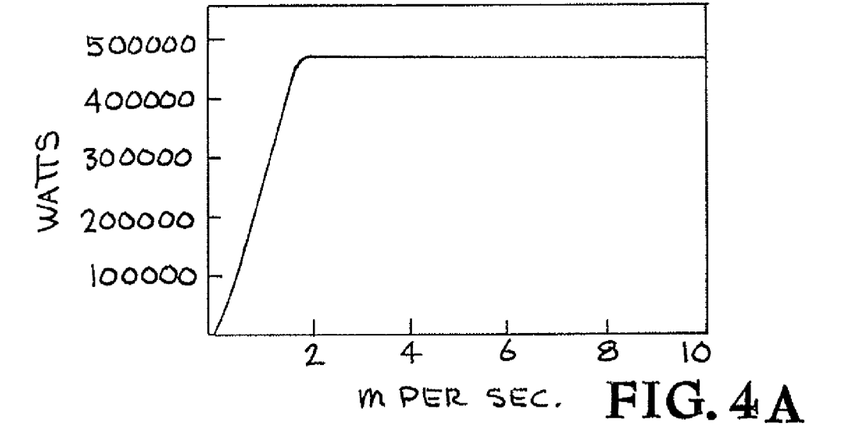
FIG. 4A shows a plot of drag power versus velocity for an Inductrack I configuration for a levitated load of 35,000 kg.
Figure 4B:
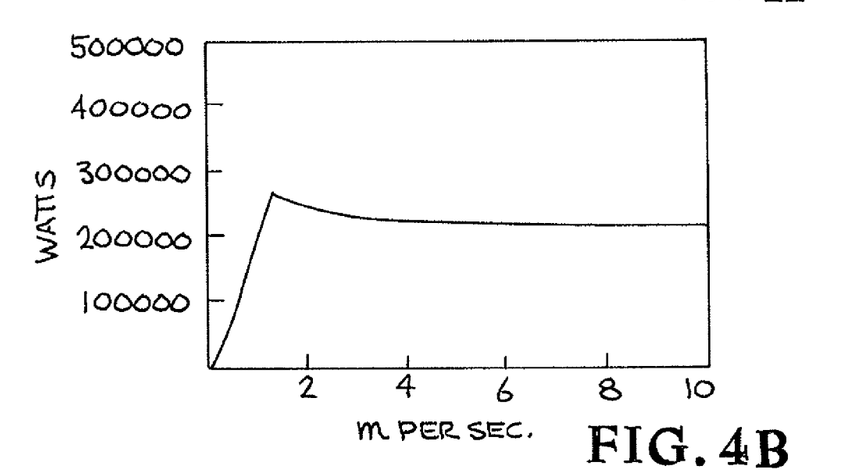
FIG. 4B shows a plot of drag power versus velocity for an Inductrack III configuration (such as that shown in FIG. 3) for a levitated load of 35,000 kg.
Figure 5A:
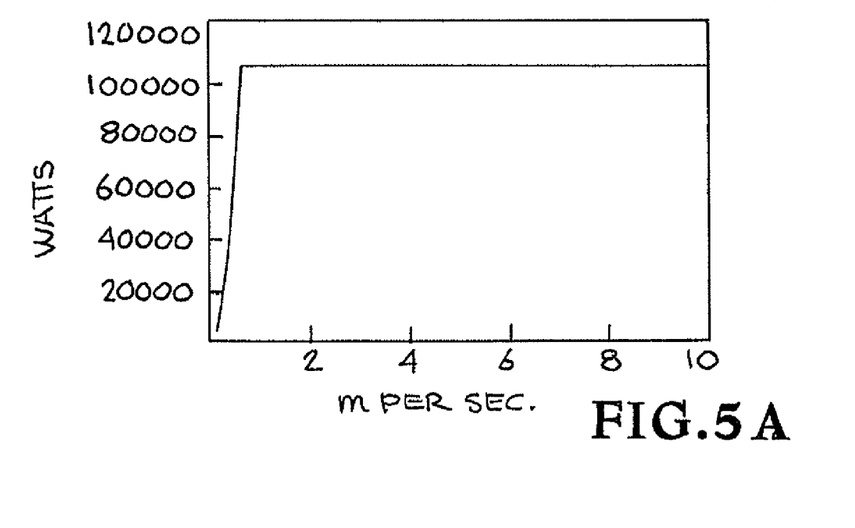
FIG. 5A shows a plot of drag power versus velocity for an Inductrack I configuration for a levitated "return trip" load of 8000 kg.
Figure 5B:
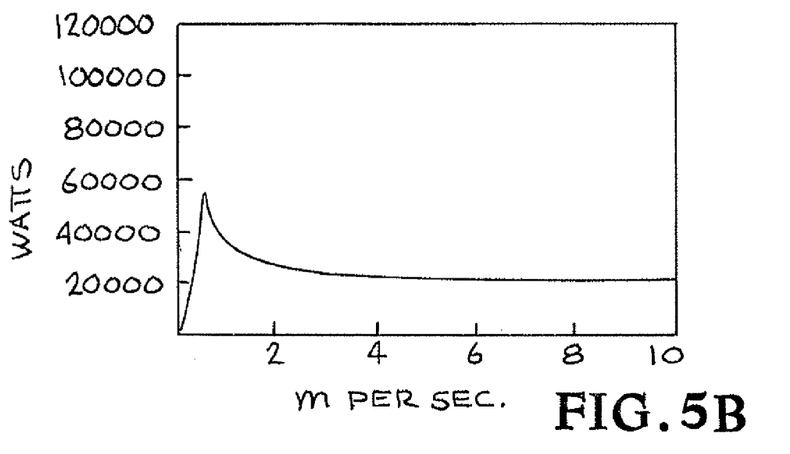
FIG. 5B shows a plot of drag power versus velocity for an Inductrack III configuration for a levitated "return trip" load of 8000 kg.

FIG. 4A shows a plot of drag power versus velocity for an Inductrack I configuration for a levitated load of 35,000 kg. Drag acts to oppose the motion of an object. FIG. 4B shows a plot of drag power versus velocity for an Inductrack III configuration (such as that shown in FIG. 3) for a levitated load of 35,000 kg. FIG. 5A shows a plot of drag power versus velocity for an Inductrack I configuration for a levitated "return trip" load of 8000 kg. FIG. 5B shows a plot of drag power versus velocity for an Inductrack III configuration for a levitated "return trip" load of 8000 kg.

The computations of FIGS. 4A through 5B assumed the use of a laminated track made up of 7 sheets of 3.175 mm thick copper, adding up to a total thickness of 25 mm. The width of the levitating portion of the track is 75.0 cm. The wavelength of the Halbach arrays in both cases is 0.5 meters. The levitating area is 3.6 m² for the Inductrack III case, and a 1.5 m² for the Inductrack I case. As can be seen, the drag power for the Inductrack III high-load case is less than 50 percent of that for the Inductrack I case, and in the low-load case it is only about 25 percent of the Inductrack I case. The cases shown are representative ones only; even higher gains could be achieved, limited only by cost and weight issues associated with the need for increasing the area of the levitating magnets.

Figure 6A:
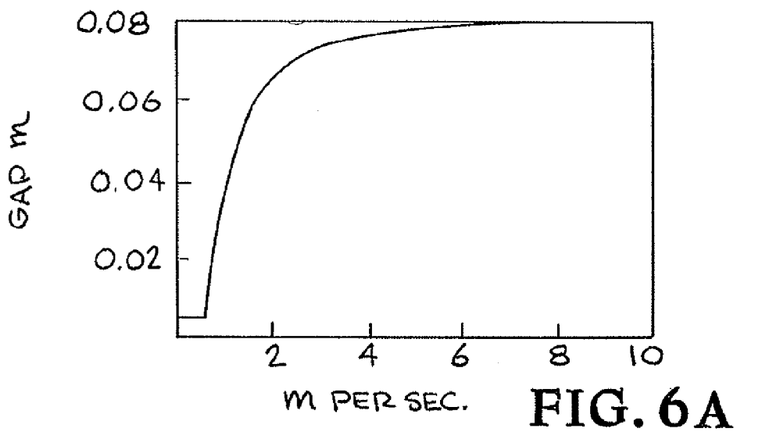
FIG. 6A is a plot of the gap versus velocity for the 8000 kg load for the same Inductrack I configuration as used in FIGS. 4A and 5A.
Figure 6B:
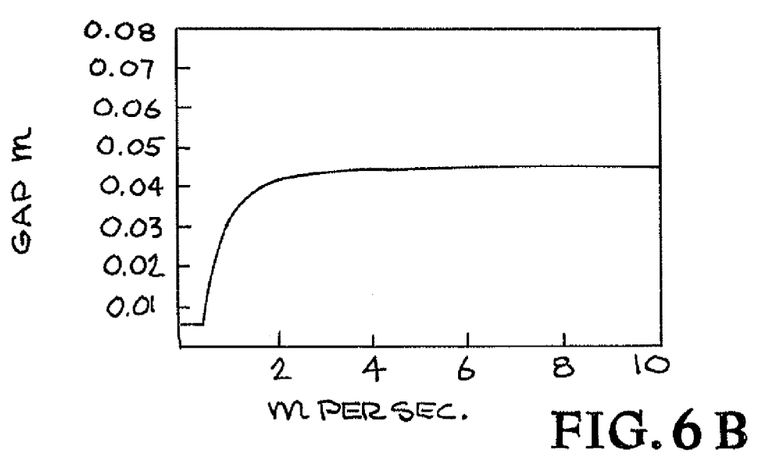
FIG. 6B is a plot of the gap versus velocity for the 8000 kg load for the same Inductrack III configuration as used in FIGS. 4B and 5B.

In addition to the gains in levitation efficiency possible with Inductrack III as compared to Inductrack I, there is another aspect of their relative performance that can be important in those cases where, as in the examples given, there is a large ratio between the loaded and unloaded weights. As noted previously, this would be the case when transporting loaded containers from a sea port to their destination depot, and then returning the containers, unloaded, to the port. In the case of Inductrack I, the levitation gap would be much larger on the return trip than that for the loaded trip. Such a large gap difference between the loaded and unloaded cases could result in problems that would complicate the design. In Inductrack III, the levitation gap change between high-load and low-load conditions can be made to be much less than is possible with Inductrack I. FIG. 6A is a plot of the gap versus velocity for the 8000 kg load for the same Inductrack I configuration as used in FIGS. 4A and 5A. FIG. 6B is a plot of the gap versus velocity for the 8000 kg load for the same Inductrack III configuration as used in FIGS. 4B and 5B. Note that the gap in the Inductrack III case rises to only about 50 percent of that for Inductrack I, which rises from a high-load value (not shown) of 2.5 cm. to 8.0 cm in the low-load case.

As discussed above, levitation efficiency can be improved substantially over that of an Inductrack I system by incorporating a dual-Halbach array alongside the single Halbach array of an Inductrack I system. The added Halbach array is polarized so that its transverse field is maximized, acting to reduce the current induced in the track and resulting in a higher levitation efficiency. It also acts to limit the change in gap with change in load. This latter feature aids in the implementation of a further improvement to the system described below.

Figure 7:
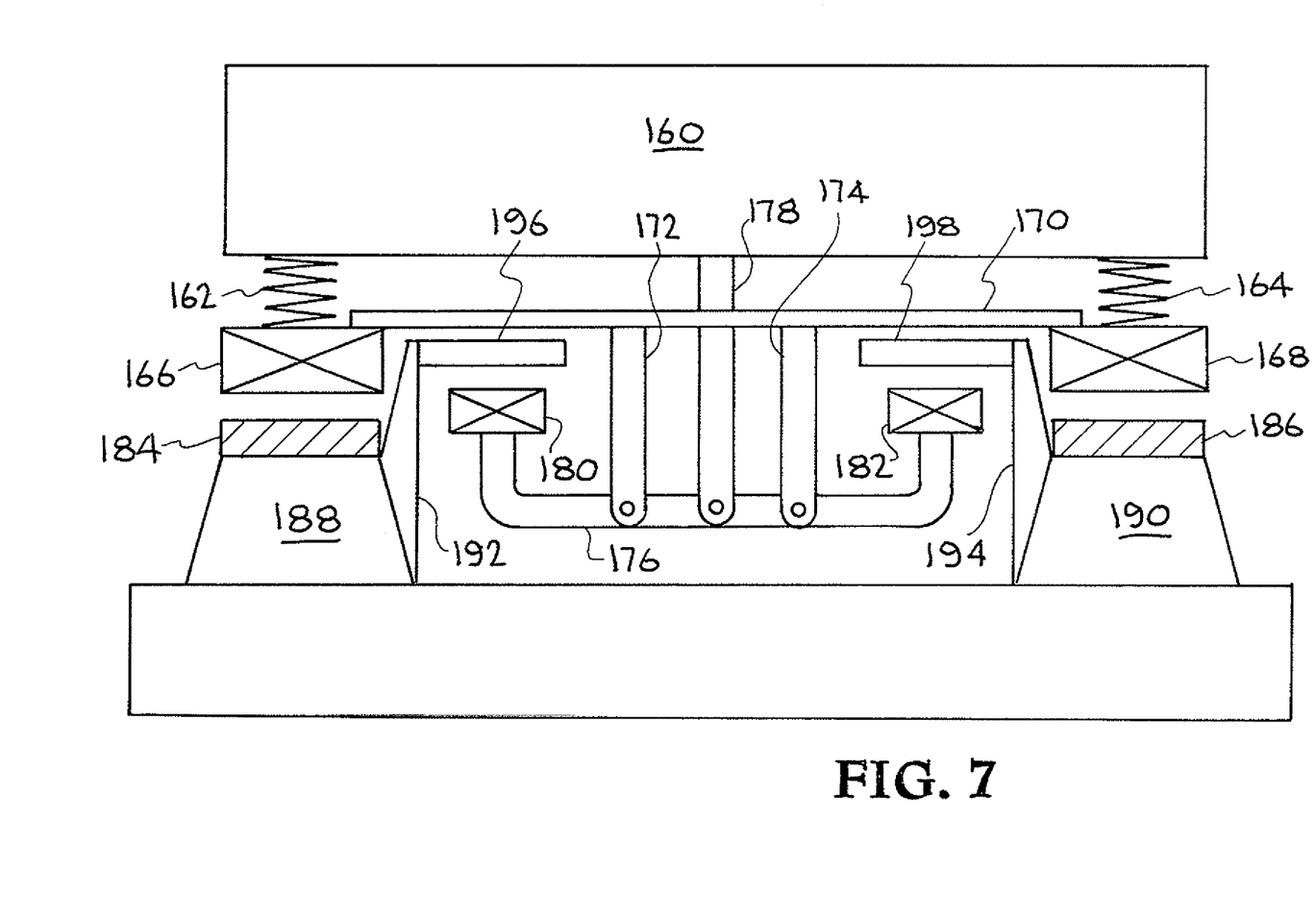
FIG. 7 illustrates an aspect of the present invention that involves the use of an adjustable set of "bias" permanent magnets (in the form of magnet bars or truncated Halbach arrays).

FIG. 7 illustrates an aspect of the present invention that involves the use of an adjustable set of "bias" permanent magnets (in the form of magnet bars or truncated Halbach arrays). These magnets, typically mounted alongside the Halbach arrays of the Inductrack III system, are attracted upward to a steel plate that comprises an element in the maglev "track" assembly. Here the word "adjustable" as applied to this new set of magnets refers to the fact that by adjusting the gap between the bias magnets and the iron plate, the fraction of the levitated load can be set and optimized, either in the "high-load" or the "low-load" case. In the context of the use of Inductrack III for containers unloaded from a container ship, "high-load" refers to transport of loaded containers from ship-side to an inter-modal station, while "low-load" refers to the return trip to the port, carrying back unloaded containers. In the figure, car body 160 is supported by suspension springs 162 and 164 which are each attached to a levitating Halbach array 166 or 168. A rigid member 170 such as a rod or plate is attached at one end to array 166 and at the other end to array 168. Two rigid members 172 and 174 are attached to rigid member 170 (in this embodiment, about equidistant from the center of rigid member 170). Another rigid member 176 with vertically extending ends is attached to the ends of rigid members 172 and 174; however, this attachment allows some relative movement, e.g., a slight rotational movement, between the ends of rigid members 172, 174 and rigid member 176. Another rigid member 178 is attached to the bottom of car body 160 and rigid member 176. In this embodiment, rigid member 178 is located at about the center of the underside of the car body 160. Attached at the ends of rigid member 176 are bias permanent magnets 180 and 182. A cross-sectional or end view of the track and supporting structure are also shown in FIG. 7. Tracks 184 and 186 are supported by support structure 188 and 190 respectively. In this embodiment, rigid support members 192 and 194 are attached to support structures 188 and 190 respectively. Rigid support members 192 and 194 support iron plates 196 and 198 respectively.

Adjustment of the gaps of the biasing magnets could be accomplished in various ways. For example, it could be automatic, in the sense that a spring-loaded lever arm built into the "bogies" carrying the levitation magnets would move in response to the imposition (or removal) of a heavy load. The response to the removal of a heavy load could either be to increase the gap of all of the bias permanent magnets, or to increase the gap of a sub-set of all the magnets, so that a smaller number of magnets remain effective in adding to the levitation provided by the Inductrack III system. FIG. 7 illustrates schematically this embodiment of the alternatives. The drawing shows how the depression of the suspension springs as a result of heavier loading results, through lever action, in reducing the gap between the bias permanent magnets and the iron plate in the track assembly to which they are attracted. The greater the loading on the car, the further down the bottom of the car body pushes rigid member 176, resulting in a lever action that forces the bias magnets up, increasing the levitating force. For simplicity an Inductrack I Halbach array is shown, rather than the Inductrack III configuration; however, the concepts involved in this aspect of the invention can be applied to any one of the three versions of Inductrack.

Another embodiment makes these adjustments by a hydraulic (or electromagnetic) system activated by the engineer or another member of the train crew, at the time of loading or unloading the train cars. The basic principle involved here is to assign a portion of the lifting force to a set of bias permanent magnets, thereby reducing the drag losses associated with the currents induced in the track of the Inductrack system, of whatever type. Levitation stability is maintained by insuring that the effective positive stiffness of the Inductrack system exceeds the negative stiffness of the bias permanent magnets over the allowed range of displacement of the levitating magnets (as set by the guide wheels that operate to support the load before levitation occurs).

Note also that the bias permanent magnets can be employed to provide lateral centering forces, achieved by sizing the iron plate dimensions so as to insure that edge effects between the bias magnets and the iron plate give rise to substantial centering forces.

The computer code that was written to model the Inductrack III performance, as discussed above, was modified to include the extra levitation from a set of bias permanent magnets in the form of rectangular bars made of NdFeB magnet material. Alternatively, a truncated Halbach array could be employed to achieve the same result, but with improved magnet efficiency compared to simple rectangular bars. A second goal of the computations was to show that at operating speeds (50 to 100 mph) the levitation efficiency of the new system could be made to be substantially higher than that of a conventional steel-wheel-on-steel-rail system (modeled by the "Davis Formula" as described in the "Standard Handbook for Mechanical Engineers," $7^{th}$ Edition, Ed. Baumeister and Fuller).

To illustrate the gains in levitation efficiency that can be expected with the modified Inductrack III configuration we will refer to earlier figures. FIGS. 4A and 4B respectively plot the calculated drag power losses as a function of speed for a loaded (35,000 kg) Inductrack I system and an unmodified Inductrack III system, showing a factor-of-two improvement in levitation efficiency achieved in this case. FIGS. 5A and 5B show similar comparison plots for unloaded (8000 kg) cases.

Figure 8A:
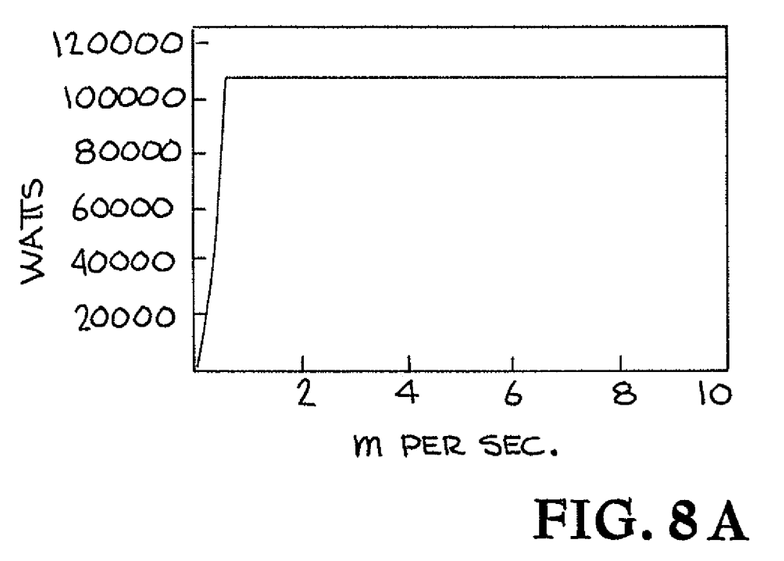
FIG. 8A shows a plot of drag power vs velocity for an Inductrack I configuration having an 8000 kg load.
Figure 8B:
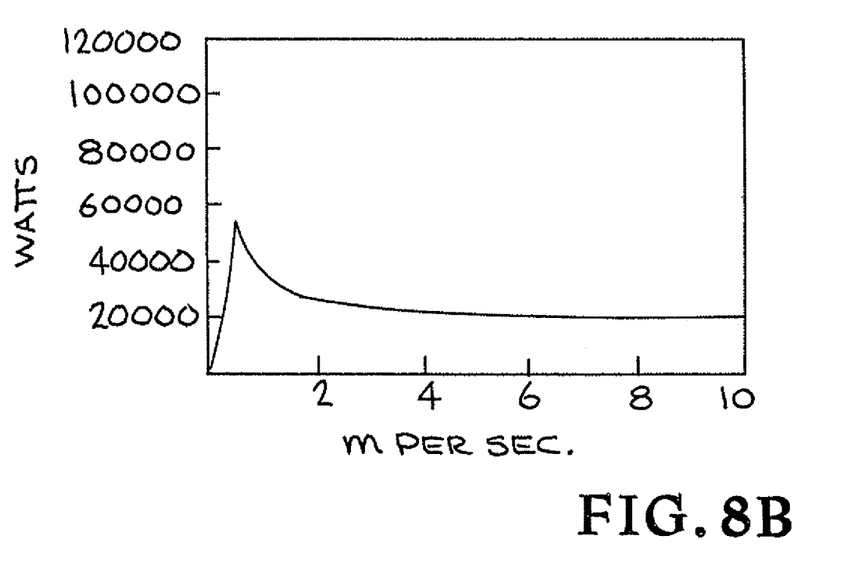
FIG. 8B shows a plot of drag power vs velocity for an Inductrack III configuration for an 8000 kg load.
Figure 9A:
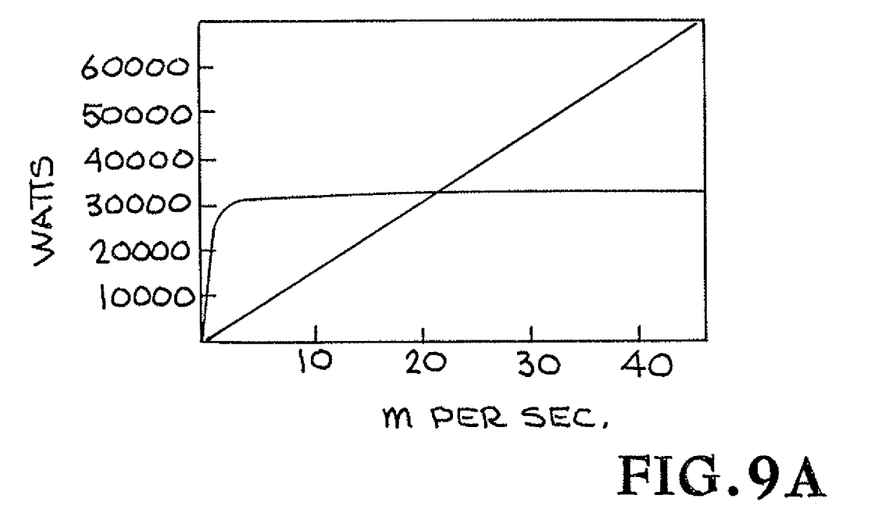
FIG. 9A shows a comparison of drag power vs velocity comparing a modified Inductrack III configuration with a Davis formula for steel wheels on steel rails with a 35000 kg load.
Figure 9B:
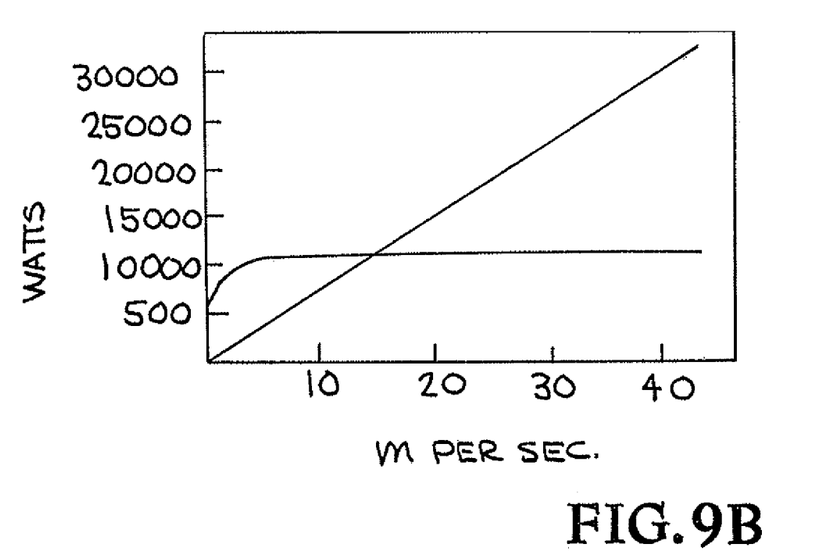
FIG. 9B shows a comparison of drag power vs velocity comparing a Modified Inductrack III configuration with a Davis formula configuration all at a 8000 kg load.

To show further the major additional improvement possible with the use of adjustable bias magnets, FIG. 8A and 8B respectively show plots of loaded and unloaded cases for the modified Inductrack III configuration. Superposed on these plots are drag power losses for the same loads as calculated from the Davis Formula. It can be seen that, except at very-low speeds, the modified Inductrack III configuration has substantially lower drag power losses than the steel-wheel-on-steel-track (Davis formula) predictions. Operationally, compared to steel-wheel-steel-rail systems this reduced drag loss could amount to a major savings in electricity costs, assuming both systems are electrically driven.

Finally, note from FIGS. 8A through 9B that when the modified Inductrack III system is compared to the simple Inductrack I configuration, a reduction in drag losses by a factor of order 20 is achieved, with, in this case, a corresponding major reduction in drive power electrical costs and drive system capital costs, whether the drive is provided through LSM motors on each car or through the use of a locomotive to drive many cars.

Accordingly, the present invention includes a system, comprising a movable object; a first Halbach array attached to said object; a second Halbach array attached to said object; a first track comprising a first levitation portion in operative proximity to said first Halbach array such that upon movement of said object, a first levitation force with be generated between said first Halbach array and said first levitation portion; a second track comprising a second levitation portion in operative proximity to said second Halbach array such that upon said movement of said object, a second levitation force with be generated between said second single-sided Halbach array and said second levitation portion; a substantially uniform support structure supporting said first levitation portion and said second levitation portion such that they are substantially uniformly supported; and means for adjusting said first levitation force and said second levitation force. The first track may further comprise a first current portion electrically connected to said first levitation portion, wherein said second track may further comprise a second current portion electrically connected to said second levitation portion.

In one embodiment, the means comprises a third Halbach array and a fourth Halbach array, wherein said third Halbach array and said fourth Halbach array are in a parallel spaced orientation and are each attached to said object and configured such that said first current portion of said first track and said second current portion of said second track are located between said third Halbach array and said fourth Halbach array.

In another embodiment the means comprises a third Halbach array, a fourth Halbach array, a fifth Halbach array and a sixth Halbach array, wherein said third Halbach array and said fourth Halbach array are in a parallel spaced orientation and are each attached to said object and configured such that said first current portion of said first track is located between said third Halbach array and said fourth Halbach array, wherein said fifth Halbach array and said sixth Halbach array are in a parallel spaced orientation and are each attached to said object and configured such that said second current portion of said second track is located between said fifth Halbach array and said sixth Halbach array. The uniform support structure may comprise a first uniform support structure and a second uniform support structure, wherein said first uniform supports said first levitation portion, wherein said second uniform support structure supports said second levitation portion, wherein said first current portion overhangs said first uniform support structure and said second current portion overhangs said second uniform support structure, wherein there is substantially no angle between said first levitation portion and said first current portion and wherein there is substantially no angle between said second levitation portion and said second current portion.

In one embodiment, the means comprises a first biasing magnet and a second biasing magnet, wherein said first biasing magnet and said second biasing magnet are attached to said movable object, wherein said means further comprises a first iron piece and a second iron piece both fixedly attached relative to said support structure and respectively are proximately and operatively positioned near said first biasing magnet and said second biasing magnet In one exemplary embodiment, the first biasing magnet and said second biasing magnet are mechanically adjustable to move toward or away from said first iron piece and said second iron piece respectively as a load on said movable object increases or decreases to add to or subtract from said first levitation force and said second levitation force respectively. In a modification of this embodiment, said first biasing magnet together with said first iron piece and said second biasing magnet together with said second iron piece are configured to provide lateral centering forces, wherein said first iron piece comprises a dimension sized to insure that edge effects between said first biasing magnet and said first iron piece give rise to a centering force and wherein said second iron piece comprises a dimension sized to insure that edge effects between said second biasing magnet and said second iron piece give rise to a centering force.

Embodiments provide that said first levitation portion and said second levitation portion are oriented at a dihedral angle with respect to each other to provide a centering force when said object is in motion. It should also be recognized that said first track is laminated and wherein said second track is laminated and further, that a linear synchronous motor (LSM) drive system can be attached to at least one of said first track or said second track, wherein said LSM comprises LSM windings and said first track and said second track comprises track windings, wherein said LSM winding are collocated with said track windings and further, wherein said LSM windings are spaced far enough from said track windings to limit inductive coupling between said LSM windings and said track windings.

Various mechanisms are described for adjusting said first levitation force and said second levitation force. For example, said means can produce a current upon said movement, wherein said means can reduce said drive current relative to at least one of said first levitating force and said second levitation force in order to optimize levitation efficiency. An aspect provides that said means can vary a parameter at least one of said third Halbach array and said fourth Halbach array to optimize levitation efficiency. An aspect provides that said means can vary a parameter at least one of said third Halbach array, said fourth Halbach array, said fifth Halbach array and said sixth Halbach to optimize levitation efficiency. An aspect provides that said means can change the relative magnetic field polarization directions of said third Halbach array and said fourth Halbach array either to reduce, or to increase, the current induced in at least one of said first track and said second track relative to that which would be induced by at least one of said first Halbach array and said second Halbach array acting alone. An aspect provides that said means can change the relative magnetic field polarization directions of said third Halbach array and said fourth Halbach array either to reduce, or to increase, the current induced in said first track relative to that which would be induced by said first Halbach array acting alone, and wherein said means can change the relative magnetic field polarization directions of said fifth Halbach array and said sixth Halbach array either to reduce, or to increase, the current induced in said second track relative to that which would be induced by said second Halbach array acting alone.

It should be understood that methods for operating the above described systems are within the scope of the present invention as well as are methods for making the above described systems.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A system, comprising:
    a movable object;
    a first levitating Halbach array attached to said object;
    a second levitating Halbach array attached to said object;
    a first track comprising a first levitation portion in operative proximity to said first levitating Halbach array such that upon movement of said object, a first levitation force with be generated between said first levitating Halbach array and said first levitation portion;
    a second track comprising a second levitation portion in operative proximity to said second levitating Halbach array such that upon said movement of said object, a second levitation force with be generated between said second levitating Halbach array and said second levitation portion;
    a substantially uniform non-cantilevered support structure supporting said first levitation portion and said second levitation portion such that they are substantially uniformly supported; and
    means for adjusting said first levitation force and said second levitation force.

2. The system of claim 1, wherein said first track further comprises a first current portion electrically connected to said first levitation portion, wherein said second track further comprises a second current portion electrically connected to said second levitation portion.

3. The system of claim 2, wherein said means comprises a third Halbach array and a fourth Ha'bath array, wherein said third Halbach array and said fourth Halbach array are in a parallel spaced orientation and are each attached to said object and configured such that said first current portion of said first track and said second current portion of said second track are located between said third Halbach array and said fourth Halbach array.

4. The system of claim 3, wherein said means can vary a parameter at least one of said third Halbach array and said fourth Halbach array to optimize levitation efficiency.

5. The system of claim 3, wherein said means can change the relative magnetic field polarization directions of said third Halbach array and said fourth Halbach array either to reduce, or to increase, the current induced in at least one of said first track and said second track relative to that which would be induced by at least one of said first Halbach array and said second Halbach array acting alone.

6. The system of claim 2, wherein said means comprises a third Halbach array, a fourth Halbacti array, a fifth Halbach array and a sixth Halbach array, wherein said third Halbach array and said fourth Halbach array are in a parallel spaced orientation and are each attached to said object and configured such that said first current portion of said first track is located between said third Halbach array and said fourth Halbach array, wherein said fifth Halbach array and said sixth Halbach array are in a parallel spaced orientation and are each attached to said object and configured such that said second current portion of said second track is located between said fifth Halbach array and said sixth Halbach array.

7. The system of claim 6, wherein said uniform support structure comprises a first uniform support structure and a second uniform support structure, wherein said first uniform structure supports said first levitation portion, wherein said second uniform support structure supports said second levitation portion, wherein said first current portion overhangs said first uniform support structure and said second current portion overhangs said second uniform support structure, wherein there is substantially no angle between said first levitation portion and said first current portion and wherein there is substantially no angle between said second levitation portion and said second current portion.

8. The system of claim 7, wherein said LSM comprises LSM windings and said first track and said second track comprises track windings, wherein said LSM winding are collocated with said track windings.

9. The system of claim 8, wherein said LSM windings are spaced far enough from said track windings to limit inductive coupling between said LSM windings and said track windings.

10. The system of claim 6, wherein said means can vary a parameter at least one of said third Halbach array, said fourth Halbach array, said fifth Halbach array and said sixth Halbach to optimize levitation efficiency.

11. The system of claim 6, wherein said means can change the relative magnetic field polarization directions of said third HalbaCh array and said fourth Halbach array either to reduce, or to increase, the current induced in said first track relative to that which would be induced by said first Halbach array acting alone, and wherein said means can change the relative magnetic field polarization directions of said fifth Halbach array and said sixth Halbach array either to reduce, or to increase, the current induced in said second track relative to that which would be induced by said second Halbach array acting alone.

12. The system of claim 1, wherein said means comprises a first biasing magnet and a second biasing magnet, wherein said first biasing magnet and said second biasing magnet are attached to said movable object, wherein said means further comprises a first iron piece and a second iron piece both fixedly attached relative to said support structure and respectively are proximately and operatively positioned near said first biasing magnet and said second biasing magnet.

13. The system of claim 12, wherein said first biasing magnet and said second biasing magnet are mechanically adjustable to move toward or away from said first iron piece and said second iron piece respectively as a load on said movable object increases or decreases to add to or subtract from said first levitation force and said second levitation force respectively.

14. The system of claim 12, wherein said first biasing magnet together with said first iron piece and said second biasing magnet together with said second iron piece are configured to provide lateral centering forces, wherein said first iron piece comprises a dimension sized to insure that edge effects between said first biasing magnet and said first iron piece give rise to, a centering force and wherein said second iron piece comprises a dimension sized to insure that edge effects between said second biasing magnet and said second iron piece give rise to a centering force.

15. The system of claim 1, wherein said first levitation portion and said second levitation portion are oriented at a dihedral angle with respect to each other to provide a centering force when said object is in motion.

16. The system of claim 1, wherein said first track is laminated and wherein said second track is laminated.

17. The system of claim 1, further comprising a linear synchronous motor (LSM) drive system attached to at least one of said first track or said second track.

18. The system of claim 1, wherein said movable object comprises a vehicle.

19. The system of claim 1, wherein said means can produce a current upon said movement, wherein said means can reduce said drive current relative to at least one of said first levitating force and said second levitation force in order to optimize levitation efficiency.

20. A method for operating a system, wherein said system comprises:
a movable object;
a first levitating Halbach array attached to said object;
a second levitating Halbach array attached to said object;
a first track comprising a first levitation portion in operative proximity to said first levitating Halbach array such that upon movement of said object, a first levitation force with be generated between said first levitating Halbach array and said first levitation portion;
a second track comprising a second levitation portion in operative proximity to said second levitating Halbach array such that upon said movement of said object, a second levitation force with be generated between said second levitating Halbach array and said second levitation portion;
a substantially uniform non-cantilevered support structure supporting said first levitation portion and said second levitation portion such that they are substantially uniformly supported; and
means for adjusting said first levitation force and said second levitation force,
wherein said method comprises adjusting said first levitation force and said second levitation force by operating said means for adjusting said first levitation force and said second levitation force.

* * * * *